US008671986B2

(12) United States Patent
Tanino et al.

(10) Patent No.: US 8,671,986 B2
(45) Date of Patent: Mar. 18, 2014

(54) HYDRAULIC CONTROLLER

(75) Inventors: Masahiro Tanino, Asakuchi-gun (JP); Manabu Ogo, Asakuchi-gun (JP); Naoki Kumazawa, Asakuchi-gun (JP)

(73) Assignee: Sanyo Kiki Co., Ltd., Okayama (JP)

( * ) Notice: Subject to any disclaimer, the term of this patent is extended or adjusted under 35 U.S.C. 154(b) by 530 days.

(21) Appl. No.: 12/602,213

(22) PCT Filed: Apr. 1, 2008

(86) PCT No.: PCT/JP2008/056497
§ 371 (c)(1),
(2), (4) Date: Dec. 30, 2009

(87) PCT Pub. No.: WO2008/149596
PCT Pub. Date: Dec. 11, 2008

(65) Prior Publication Data

US 2010/0139791 A1 Jun. 10, 2010

(30) Foreign Application Priority Data

Jun. 5, 2007 (JP) ................................. 2007-149351

(51) Int. Cl.
*F16K 11/07* (2006.01)

(52) U.S. Cl.
USPC ........................................ 137/625.69; 91/447

(58) Field of Classification Search
USPC ................................ 137/625.69; 91/445–447
See application file for complete search history.

(56) References Cited

U.S. PATENT DOCUMENTS 2,959,190 A * 11/1960 Barnes et al. ............ 137/624.27
3,183,785 A * 5/1965 Bidlack ............................ 91/20
3,198,088 A * 8/1965 Johnson et al. ................. 91/420
3,980,000 A * 9/1976 Iijima et al. ..................... 91/514
4,622,886 A * 11/1986 Imada et al. .................... 91/520
4,665,801 A * 5/1987 Budzich .......................... 91/420
4,688,470 A * 8/1987 Budzich .......................... 91/420

(Continued)

FOREIGN PATENT DOCUMENTS

JP 55-078803 6/1980
JP 01-261505 10/1989

(Continued)

OTHER PUBLICATIONS

International Search Report issued May 1, 2008 in International (PCT) Application No. PCT/JP2008/056497.
International Preliminary Report on Patentability and Written Opinion of the International Searching Authority issued Dec. 17, 2009 in International (PCT) Application No. PCT/JP2008/056497 of which the present application is the U.S. National Stage.

*Primary Examiner* — John Rivell
*Assistant Examiner* — Matthew W Jellett
(74) *Attorney, Agent, or Firm* — Wenderoth, Lind & Ponack, L.L.P.

(57) ABSTRACT

A pair of supply/drain pipes continuous with an actuator are respectively communicable with a pair of oil sumps respectively through an intermediation of a pair of extended paths. The pair of oil sumps is formed in a switch-spool insertion hole and enter a neutral state or a state of being selectively communicated with any one of respective pressure-oil paths and respective oil-return paths. A non-leak valve is provided over respective connection portions and between the pair of supply/drain pipes and the pair of extended paths. The non-leak valve is opened when an operation of a pump is started, is maintained to be opened during the operation of the pump, and is closed when the pump is out of operation.

13 Claims, 9 Drawing Sheets

(56) References Cited

U.S. PATENT DOCUMENTS

| | | | | |
|---|---|---|---|---|
| 4,741,248 | A * | 5/1988 | Budzich | 91/421 |
| 4,793,238 | A * | 12/1988 | Budzich | 91/421 |
| 4,854,222 | A * | 8/1989 | Vick | 91/447 |
| 5,067,389 | A * | 11/1991 | St. Germain | 91/446 |
| 5,921,165 | A * | 7/1999 | Takahashi et al. | 91/426 |
| 2001/0042435 | A1* | 11/2001 | Porter et al. | 91/445 |
| 2002/0134227 | A1* | 9/2002 | Nakatani et al. | 91/446 |
| 2003/0000373 | A1* | 1/2003 | Weber et al. | 91/446 |
| 2006/0163508 | A1 | 7/2006 | Satake et al. | |
| 2008/0121101 | A1* | 5/2008 | Park | 91/446 |
| 2009/0078111 | A1* | 3/2009 | Hyang | 91/446 |

FOREIGN PATENT DOCUMENTS

| | | |
|---|---|---|
| JP | 5-507138 | 10/1993 |
| JP | 3839633 | 8/2001 |
| JP | 2002-098102 | 4/2002 |
| WO | 91/19108 | 12/1991 |
| WO | 2004/061313 | 7/2004 |

* cited by examiner

HYDRAULIC CONTROLLER

TECHNICAL FIELD

The present invention relates to a hydraulic controller, and more specifically, to an improvement of a hydraulic controller for controlling an operation of a hydraulic actuator to be mounted to a work vehicle and the like.

BACKGROUND ART

As is well known, as work vehicles used in civil engineering work and agricultural work of various types, there may be given one broadly put into practical use, which has a structure with which, with use of a hydraulic actuator constituted by a piston cylinder, an oil motor, and the like, an operation such as up-down movement is performed with respect to an operating member attached to a vehicle body. Examples of the work vehicle include well-known one adopting a structure in which a front loader having a bucket at a leading end thereof is detachably mounted to a vehicle body constituted by a tractor so that various operations are performed with the bucket while the leading end of the front loader is moved up-down with the hydraulic actuator.

In the work vehicles of this type, the hydraulic controller for controlling an operation of the actuator is provided with a spool valve as a direction switch valve. When the spool valve is used, oil leakage occurs from between the spool valve and a spool insertion hole because the spool valve is inserted into the spool insertion hole formed in a housing and is moved while sliding in a valve shaft direction. Thus, in the above-mentioned example, there is a disadvantage as follows: when the leading end of the front loader is stopped at a predetermined height position and left as it is in a state where an engine is turned off, the actuator is incapable of supporting the weight of the front loader owing to the oil leakage, with the result that the leading end of the front loader descends so that a posture of the bucket is disturbed.

In view of the problems as described above, for example, Patent Document 1 described below discloses a hydraulic controller in which a housing is provided with a switch-spool insertion hole through which a switch-spool valve as a direction switch valve is inserted, the switch-spool insertion hole being provided with a pair of ports to which a pair of supply/drain pipes continuous with an actuator are connected, and check valves for preventing communication of oil returning from the actuator toward the switch-spool insertion hole are provided to those ports, respectively. On the switch-spool valve of this controller, there are partially formed tapered surfaces at two points, each of which is gradually increased in diameter toward one side in the valve shaft direction. Leading ends of the check valves are arranged so as to be brought into contact with those tapered surfaces, respectively. In this context, when the switch-spool valve is moved from a neutral position into a valve shaft direction by manipulation, an electromagnetic means, or the like, the check valve provided in the port on a side from which pressure oil flows out into the actuator is opened by being pushed up by the pressure oil, and the check valve provided in the port on a side to which the pressure oil flows in from the actuator is opened by being pushed up by the tapered surface of the switch-spool valve.

Patent Document 1: JP 3839633 B

SUMMARY OF THE INVENTION

Problem to be Solved by the Invention

Incidentally, in the hydraulic controller disclosed in Patent Document 1 mentioned above, oil pressure acts from the actuator side onto the check valve when the tapered surface of the switch-spool valve pushes up the check valve, and hence it is necessary to perform an operation to move the switch-spool valve in the valve shaft direction against the oil pressure. In this case, when the pressure receiving area of the check valve is increased, the operating force for moving the switch-spool valve in the valve shaft direction inevitably becomes larger.

Thus, it is inevitable to decrease the pressure receiving area of the check valve, and hence it is necessary to decrease a flow path area of oil at the time of flowing through the check valve. That is, a pressure loss is increased, and hence it is difficult to perform designing corresponding to a high flow rate.

In addition, in the hydraulic controller disclosed in Patent Document 1 mentioned above, every time the spool valve is moved in the valve shaft direction after being returned to the neutral position, the check valves are repeatedly opened/closed. Thus, earlier deterioration is also caused in the following members: seat portions of the check valves, springs elastically urging the check valves, and the like. As a result, there is also a risk of causing deterioration of durability of the hydraulic controller.

Under the above-mentioned circumstances, a technical object of the present invention is to enhance the durability of the hydraulic controller by enabling the following while appropriately securing communication-preventing properties with respect to the oil returning from the actuator toward the switch-spool insertion hole: designing of the flow path area corresponding to supply/drain of oil at a required high flow rate with respect to the actuator, and omission of unnecessary operations of the valve used for preventing communication of the returning oil.

Means for solving the Problems

The present invention has been made to achieve the above-mentioned technical object, and provides a hydraulic controller including the following:

a pair of supply/drain pipes continuous with an actuator;

pressure-oil paths continuous with a pump;

oil-return paths continuous with a tank;

a switch-spool insertion hole which is formed in a housing and through an intermediation of which the pipes and paths are communicated with each other; and a switch-spool valve which is liquid-tightly inserted into the switch-spool insertion hole so as to form a desired oil path. In the hydraulic controller, the pair of supply/drain pipes are respectively communicable with a pair of oil sumps each other through an intermediation of a pair of respective extended paths, the pair of oil sumps being formed in the switch-spool insertion hole and being capable of entering a neutral state or a state of being selectively communicated with any one of the respective pressure-oil paths and the respective oil-return paths, and a non-leak valve, which is closed so as to prevent communication of oil returning toward the switch-spool insertion hole, is provided over respective connection portions between the pair of supply/drain pipes and the pair of extended paths, the non-leak valve being opened when an operation of the pump is started, being maintained to be opened during the operation of the pump, and being closed when the pump is out of operation.

With this structure, the non-leak valve is closed when the pump is out of operation, and hence it is possible to prevent the communication of the oil returning from the pair of supply/drain pipes continuous with the actuator toward the switch-spool insertion hole. Specifically, the pair of oil sumps formed in the switch-spool insertion hole may enter the state of being selectively communicated with any one of the respective pressure-oil paths continuous with the pump and the respective oil-return paths continuous with the tank, or the neutral state, and the extended paths are extended from the pair of oil sumps, respectively. In this context, those extended paths are respectively connected to the pair of supply/drain pipes continuous with the actuator, and the non-leak valve is provided over the pair of connection portions so as to open/close the connection portions. Thus, the non-leak valve is closed when the pump is out of operation (while the engine is turned off, for example), and hence the oil fed from the actuator is prevented from returning to the switch-spool insertion hole. Meanwhile, the non-leak valve is opened when the operation of the pump is started (when the engine is switched from a state of being turned off to a state of being turned on, for example), and hence both the connection portions are opened. Thus, the oil can be supplied/drained with respect to the actuator from the pair of oil sumps formed in the switch-spool insertion hole. Accordingly, when the pair of oil sumps in the switch-spool insertion hole are in the neutral state (that is, state in which the pair of oil sumps are not communicated with any of the respective pressure-oil paths continuous with the pump and the respective oil-return paths continuous with the tank) at the start of the operation of the pump, the oil fed from the actuator is stopped in the pair of oil sumps. The non-leak valve is maintained in an opened state during the operation of the pump thereafter. Thus, when the switch-spool valve is moved from the neutral position and the neutral state is switched into the state in which the pair of oil sumps are communicated with the respective pressure-oil paths and the respective oil-return paths, the pressure oil fed from the pump is supplied into the actuator through the pressure-oil paths, one of the extended paths, and one of the supply/drain pipes, and the oil fed from the actuator is returned to the tank through the other supply/drain pipe, the other extended path, and the oil-return paths. With this, the actuator performs a predetermined operation. Owing to the operation as described above, influence of variations in load during the operation of the actuator is remarkably reduced in comparison with the conventional cases, with the result that the operating speed of the actuator can be easily controlled. In addition, the non-leak valve is maintained in an opened state during the operation of the pump, and hence unnecessary operations of the non-leak valve are omitted and durability of the hydraulic controller is enhanced. Note that, it is preferred that an arrangement region of the switch-spool valve and an arrangement region of the non-leak valve in the housing be separated from each other without interference.

In this case, it is preferred that the non-leak valve be moved in an opening direction and opened by pressure oil fed from the pump when the operation of the pump is started, be maintained to be opened by the pressure oil during the operation of the pump, and be moved in a closing direction owing to stoppage of feed of the pressure oil and closed when the pump is out of operation.

With this, the pump used for supplying the pressure oil into the actuator is used also for opening/closing the non-leak valve. In this manner, the pump is effectively used, which can contribute to reduction in the number of components of the hydraulic controller and reduction in manufacturing cost.

Further, it is preferred that the switch-spool valve and the non-leak valve be incorporated in separate housings.

With this, the one housing having a structure for incorporating the switch-spool valve and the other housing having a structure for incorporating the non-leak valve may be processed separately from each other so that the other housing is fixed and assembled to the one housing or both the housings are arranged separately from each other and assembled to each other through an intermediation of a separate path-constituting member. With this, it is possible to facilitate not only process working on the housings but also maintenance, repairs, and the like thereon. In addition, advantage in terms of layout is achieved.

In the above-mentioned structure, the non-leak valve may include a single non-leak spool valve for simultaneously opening/closing the respective connection portions between the pair of supply/drain pipes and the pair of extended paths.

With this, by forming, at two points in an axial direction of an auxiliary-spool insertion hole formed in the housing so as to insert the non-leak spool valve therethrough, the respective connection portions between the pair of supply/drain pipes and the pair of extended paths as oil-pool control portions, the connection portions are simultaneously opened and shut off in accordance with the movement in the valve shaft direction of the non-leak spool valve.

Further, in the above-mentioned structure, the non-leak valve may include a pair of non-leak check valves for simultaneously and individually opening/closing the respective connection portions between the pair of supply/drain pipes and the pair of extended paths.

With this, by forming, around respective seat portions of a pair of check insertion holes formed in the housing so as to insert the pair of non-leak check valves therethrough, the respective connection portions between the pair of supply/drain pipes and the pair of extended paths as oil-pool control portions, the connection portions are simultaneously opened and shut off in accordance with contact and separation of the non-leak check valves with respect to the seats.

Effects of the Invention

As described above, according to the hydraulic controller of the present invention, restriction on the flow rate of the oil supplied/drained with respect to the actuator is eliminated unlike conventional cases, and it is possible to appropriately secure communication-preventing properties with respect to the oil returning from the actuator toward the switch-spool insertion hole, and possible to supply/drain oil at a required high flow rate with respect to the actuator. Simultaneously, operability of the actuator is enhanced and the non-leak valve is maintained in an opened state during the operation of the pump. As a result, the unnecessary operations of the non-leak valve are omitted and the durability of the hydraulic controller is enhanced.

DESCRIPTION OF REFERENCE SYMBOLS

Figure 1A:
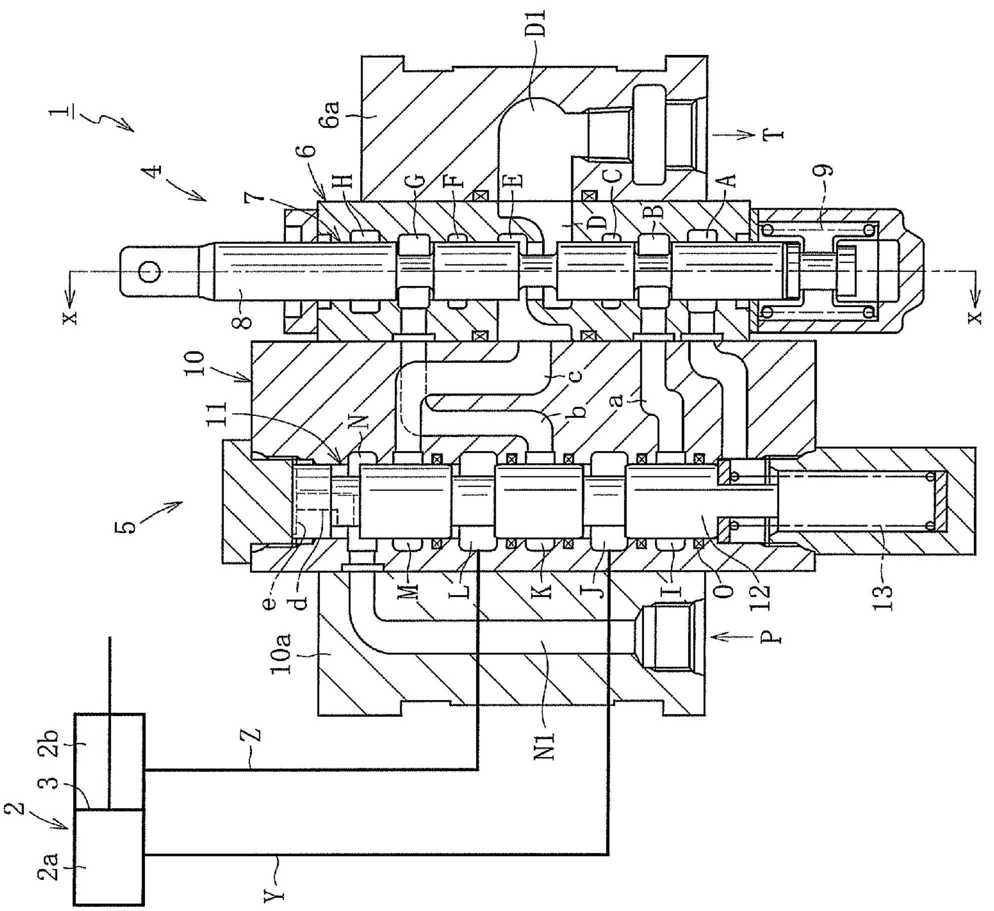
FIG. 1*a* is a vertical sectional front view of a hydraulic controller according to a first embodiment of the present invention.

1 hydraulic controller
2 actuator (piston cylinder)
6 main housing
7 switch-spool insertion hole
8 switch-spool valve
10 auxiliary housing
12 non-leak valve (non-leak spool valve)
25 non-leak valve (first non-leak check valve)
26 non-leak valve (second non-leak check valve)
A, B, C oil sump
F, G, H oil sump
I, J connection portion
L, M connection portion
P pump
T tank
S, V pressure-oil path
Y, Z supply/drain pipe
a, b extended path

DETAILED DESCRIPTION OF THE INVENTION

Figure 1B:
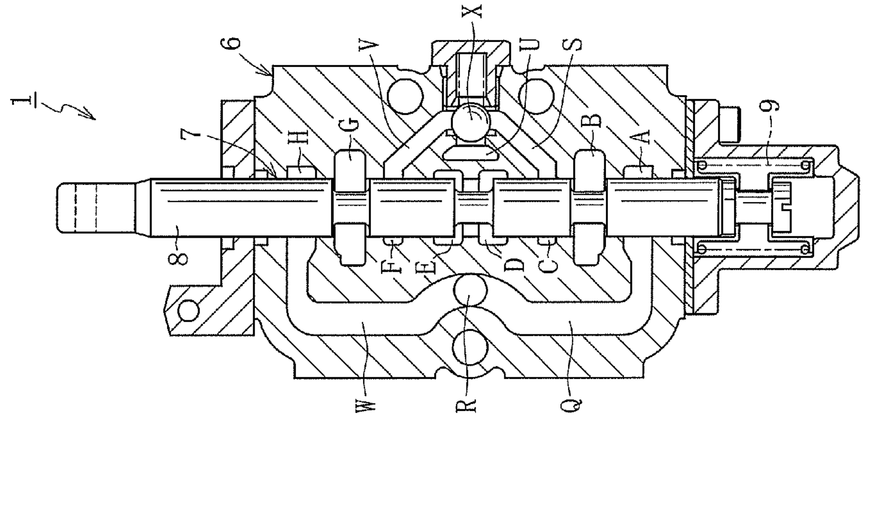
FIG. 1*b* is a sectional view taken along the line x-x of FIG. 1*a*.
Figure 2:
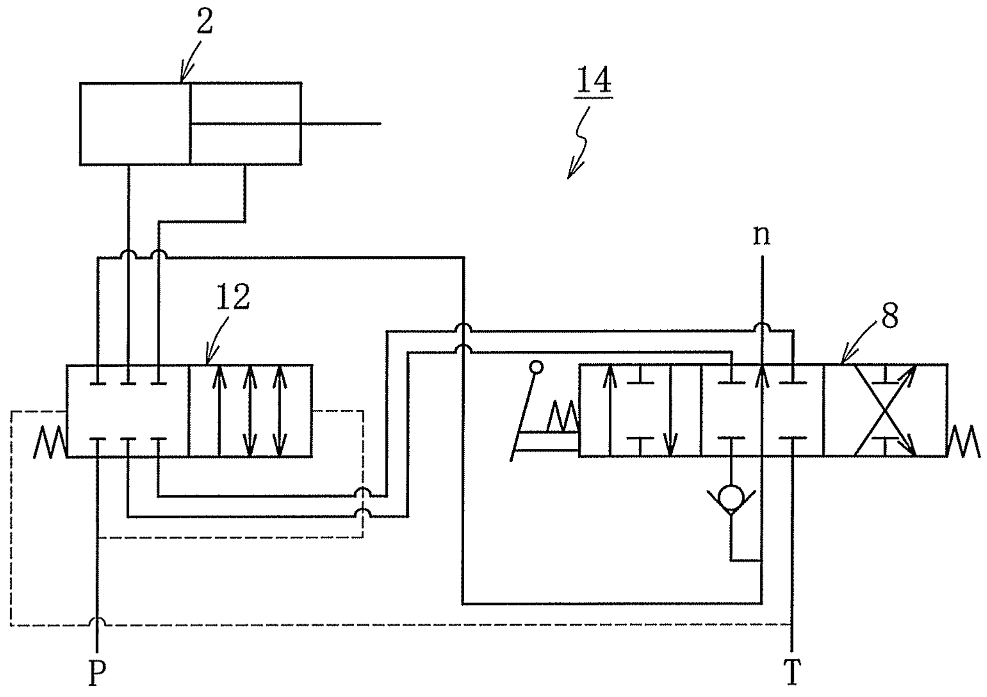
FIG. 2 is a diagram of a hydraulic circuit equivalent to the hydraulic controller illustrated in FIGS. 1*a* and 1*b*.

In the following, description is made on embodiments of the present invention with reference to accompanying drawings. FIG. 1*a* is a schematic vertical sectional front view of a hydraulic controller according to a first embodiment of the present invention, FIG. 1*b* is a sectional view taken along the line x-x of FIG. 1*a*, and FIG. 2 is a diagram of a hydraulic circuit of the controller. Note that, the hydraulic controller is used for controlling an operation of a front loader detachably mounted to front of a body of a work vehicle (tractor and the like).

As illustrated in FIG. 1*a*, a hydraulic controller 1 includes a piston cylinder 2 as a hydraulic actuator, a direction switch means 4 for changing a moving direction of a piston 3 of the piston cylinder 2, and a leakage prevention means 5 for preventing communication of oil returning from the piston cylinder 2 toward the direction switch means 4.

The direction switch means 4 includes a main housing 6, a switch-spool insertion hole 7 formed in the main housing 6 and linearly extending, a switch-spool valve 8 liquid-tightly inserted in the switch-spool insertion hole 7, and a main spring 9 for elastically urging the switch-spool valve 8 to one side of the valve shaft direction (downward). Further, in the switch-spool insertion hole 7, there are communicably formed a plurality of oil sumps (first oil sump A to eighth oil sump H) communicable with pipes and paths described later. In addition, a main additional housing 6*a* is fixed on one side (right side) of the main housing 6, and in the main additional housing 6*a*, there is formed an outlet path D1 having one end continuous with the fourth oil sump D and the other end communicated with a tank T.

Meanwhile, the leakage prevention means 5 includes an auxiliary housing 10, a non-leak insertion hole 11 formed in the auxiliary housing 10 and linearly extending, a non-leak valve (non-leak spool valve) 12 liquid-tightly inserted in the non-leak insertion hole 11, and an auxiliary spring 13 for elastically urging the non-leak spool valve 12 to one side (upward). Further, in the non-leak insertion hole 11, there are communicably formed a plurality of oil sumps (ninth oil sump I to fourteenth oil sump N) communicable with pipes and paths described later. In addition, an auxiliary additional housing 10*a* is fixed on one side (left side) of the auxiliary housing 10, and in the auxiliary additional housing 10*a*, there is formed an inlet path N1 having one end continuous with the fourteenth oil sump N and the other end communicated with a pump P. Note that, on both sides of the valve shaft direction of each of the ninth oil sump I to the twelfth oil sump L, there are arranged seal members (gaskets) O.

As illustrated in FIG. 1*b*, the first oil sump A of the switch-spool insertion hole 7 is communicated with a first oil-return path Q. The first oil-return path Q is communicated with an outlet port R to the tank T, and the third oil sump C is communicated with a first pressure-oil path S. The first pressure-oil path S is communicated with a discharge port U for discharging pressure oil fed from the pump P. Further, the fourth oil sump D is communicated with the tank T, and the fifth oil sump E is communicated with the pump P. In the illustrated state, the fourth oil sump D and the fifth oil sump E are communicated with each other. Further, the sixth oil sump F is communicated with a second pressure-oil path V. The second pressure-oil path V is communicated with the discharge port U, and the eighth oil sump H is communicated with a second oil-return path W. The second oil-return path W is communicated with the outlet port R. Note that, a check valve X illustrated in FIG. 1*b* is provided for preventing backflow from the first pressure-oil path S or the second pressure-oil path V to the discharge port U.

Further, when the switch-spool valve 8 is moved downward in the illustrated state (transfers to the state of FIG. 5*b*), the sixth oil sump F and the seventh oil sump G are communicated with each other so that pressure oil from the discharge port U flows into the seventh oil sump G through the second pressure-oil path V, and the first oil sump A and the second oil sump B are communicated with each other so that oil from the second oil sump B is let out into the tank T through the first oil-return path Q. Meanwhile, when the switch-spool valve 8 is moved upward in the state illustrated in FIG. 1*b*, the second oil sump B and the third oil sump C are communicated with each other so that the pressure oil from the discharge port U flows into the second oil sump B through the first pressure-oil path S, and the seventh oil sump G and the eighth oil sump H are communicated with each other so that oil from the seventh oil sump G is let out into the tank T through the second oil-return path W.

Meanwhile, as illustrated in FIG. 1*a*, the tenth oil sump J of the non-leak insertion hole 11 is communicated with a front space 2*a* of the piston 3 in the piston cylinder 2 through an intermediation of a first supply/drain pipe Y, and the twelfth oil sump L is communicated with a rear space 2*b* of the piston 3 in the piston cylinder 2 through an intermediation of a second supply/drain pipe Z. Further, the ninth oil sump I of the non-leak insertion hole 11 is communicated with the second oil sump B of the switch-spool insertion hole 7 through an intermediation of a first extended path a, and the eleventh oil sump K of the non-leak insertion hole 11 is communicated with the seventh oil sump G of the switch-spool insertion hole 7 through an intermediation of a second extended path b. Further, the thirteenth oil sump M of the non-leak insertion hole 11 is communicated with the fifth oil sump E of the switch-spool insertion hole 7 through an intermediation of a neutral path c. Note that, the fourteenth oil sump N is communicated with a switch oil sump e through an intermediation of an inner hole d formed in the non-leak spool valve 12.

Further, when the non-leak spool valve 12 is moved downward in the illustrated state (transfers to the state of FIG. 3*a*), the eleventh oil sump K and the twelfth oil sump L of the non-leak insertion hole 11 are communicated with each other so that the second supply/drain pipe Z from the rear space 2*b* of the piston cylinder 2 and the seventh oil sump G of the switch-spool insertion hole 7 are communicated with each other, and the ninth oil sump I and the tenth oil sump J of the non-leak insertion hole 11 are communicated with each other so that the first supply/drain pipe Y from the front space 2*a* of the piston cylinder 2 and the second oil sump B of the switch-spool insertion hole 7 are communicated with each other. Accordingly, a connection portion between the first supply/drain pipe Y and the first extended path a, that is, a space between the ninth oil sump I and the tenth oil sump J is opened/closed by the non-leak spool valve 12, and a connection portion between the second supply/drain pipe Z and the second extended path b, that is, a space between the eleventh oil sump K and the twelfth oil sump L is opened/closed by the non-leak spool valve 12.

Next, description is made on an operation of the hydraulic controller 1 according to the first embodiment.

FIGS. 1*a* and 1*b* illustrate the hydraulic controller 1 when the pump P is out of operation (while an engine of a work vehicle is turned off). In this state, both the tenth oil sump J and the twelfth oil sump L of the non-leak insertion hole 11, which are respectively communicated with the first supply/drain pipe Y and the second supply/drain pipe Z from the piston cylinder 2, are closed by the non-leak spool valve 12. Accordingly, both the first supply/drain pipe Y and the second supply/drain pipe Z are maintained in the state of being completely shut off from the switch-spool insertion hole 7. Further, when the piston 3 of the piston cylinder 2 is pressed forward, pressure oil in the front space 2*a* of the piston cylinder 2 fills the first supply/drain pipe Y and the tenth oil sump J, and when the piston 3 of the piston cylinder 2 is pressed rearward, pressure oil in the rear space 2*b* of the piston cylinder 2 fills the second supply/drain pipe Z and the twelfth oil sump L. With this, even when load acts on the piston 3 of the piston cylinder 2, the movement of the piston 3 is reliably prevented. The state of the hydraulic controller 1 as described above is equivalent to the state of a hydraulic circuit 14 illustrated in FIG. 2, and the switch-spool valve 8 is located at a neutral position in this state.

Figure 3A:
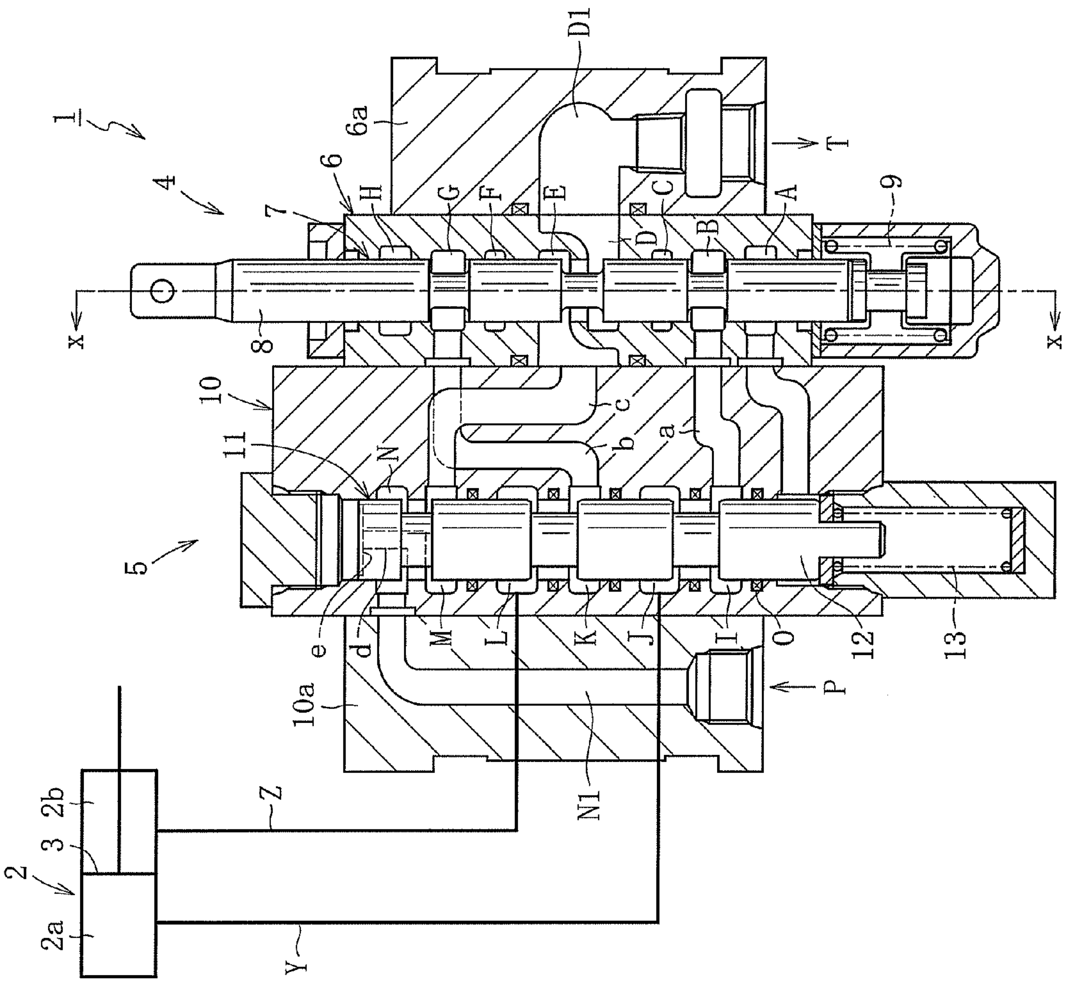
FIG. 3*a* is a vertical sectional front view of a state in which a non-leak valve of the hydraulic controller according to the first embodiment is switched.
Figure 3B:
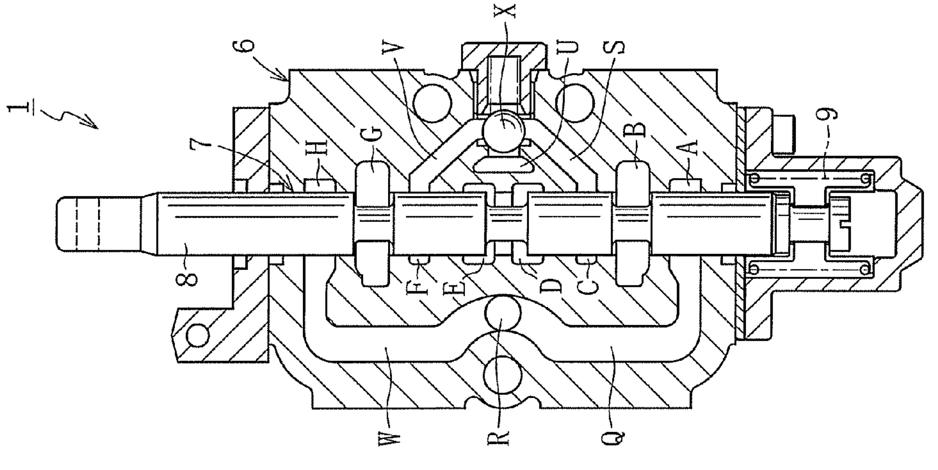
FIG. 3*b* is a sectional view taken along the line x-x of FIG. 3*a*.
Figure 4:
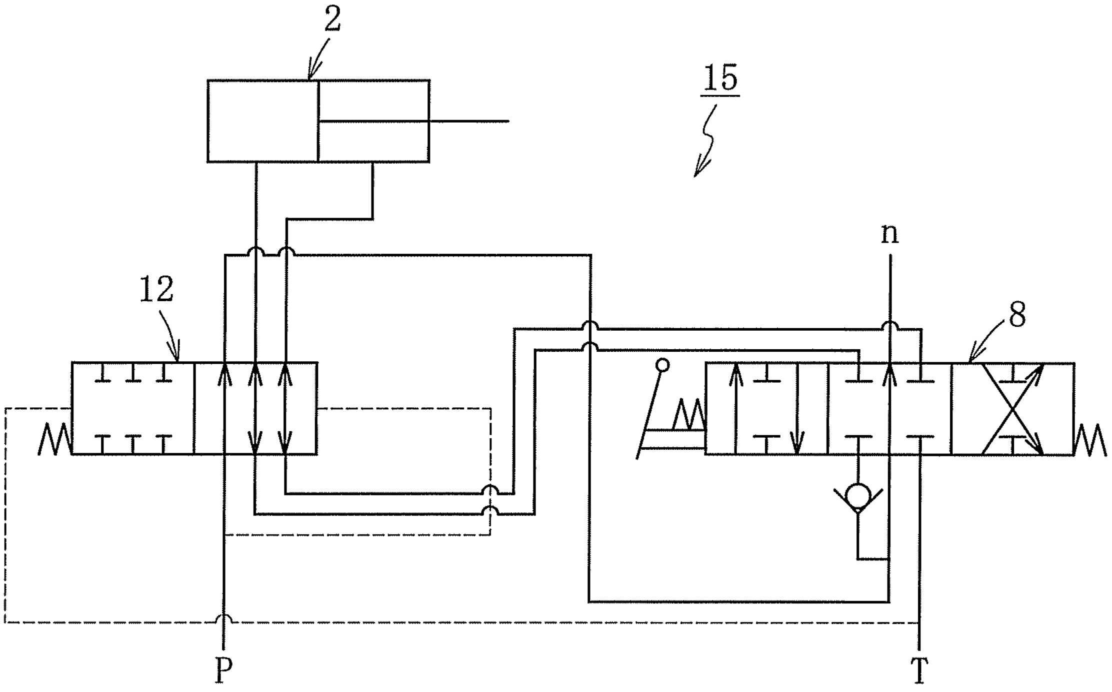
FIG. 4 is a diagram of a hydraulic circuit equivalent to the hydraulic controller illustrated in FIGS. 3*a* and 3*b*.

FIGS. 3*a* and 3*b* illustrate the hydraulic controller 1 when the operation of the pump P is started (when the engine of a work vehicle is turned on). In this state, the pressure oil fed from the pump P is supplied into the switch oil sump e through the inlet path N1, and hence the non-leak spool valve 12 is moved downward against the spring force of the auxiliary spring 13. With this, the ninth oil sump I and the tenth oil sump J of the non-leak insertion hole 11 are communicated with each other so that the first supply/drain pipe Y from the front space 2*a* of the piston cylinder 2 is communicated with the second oil sump B of the switch-spool insertion hole 7 through an intermediation of the first extended path a, and the eleventh oil sump K and the twelfth oil sump L of the non-leak insertion hole 11 are communicated with each other so that the second supply/drain pipe Z from the rear space 2*b* of the piston cylinder 2 is communicated with the seventh oil sump G of the switch-spool insertion hole 7 through an intermediation of the second extended path b. As a result, the piston 3 in the piston cylinder 2 is released from the movement prevented state. The state of the hydraulic controller 1 at this time point is equivalent to the state of a hydraulic circuit 15 illustrated in FIG. 4, and the switch-spool valve 8 is located at the neutral position. Further, at this time point, the thirteenth oil sump M and the fourteenth oil sump N of the non-leak insertion hole 11 are communicated with each other, and hence the pressure oil fed from the pump P to the inlet path N1 flows into the fifth oil sump E of the switch-spool insertion hole 7 through the neutral path c. At the same time, the fifth oil sump E and the fourth oil sump D are communicated with each other, and hence an idling operation can be performed.

Figure 5A:
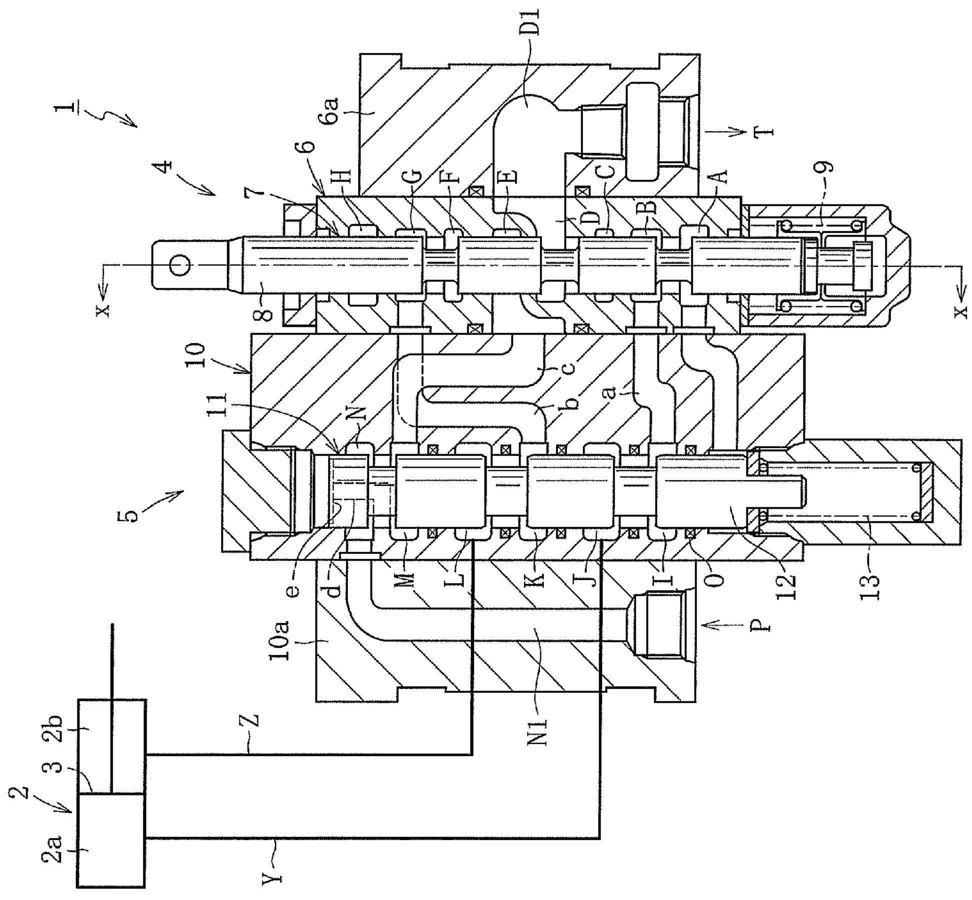
FIG. 5*a* is a vertical sectional front view of a state in which a switch-spool valve of the hydraulic controller according to the first embodiment is switched.
Figure 5B:
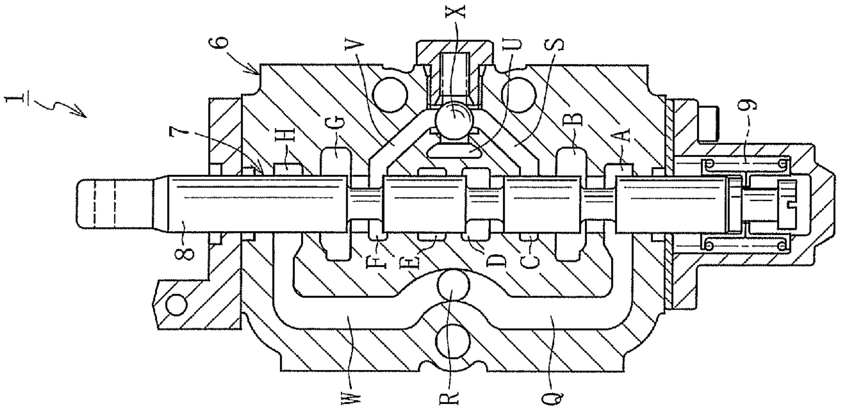
FIG. 5*b* is a sectional view taken along the line x-x of FIG. 5*a*.
Figure 6:
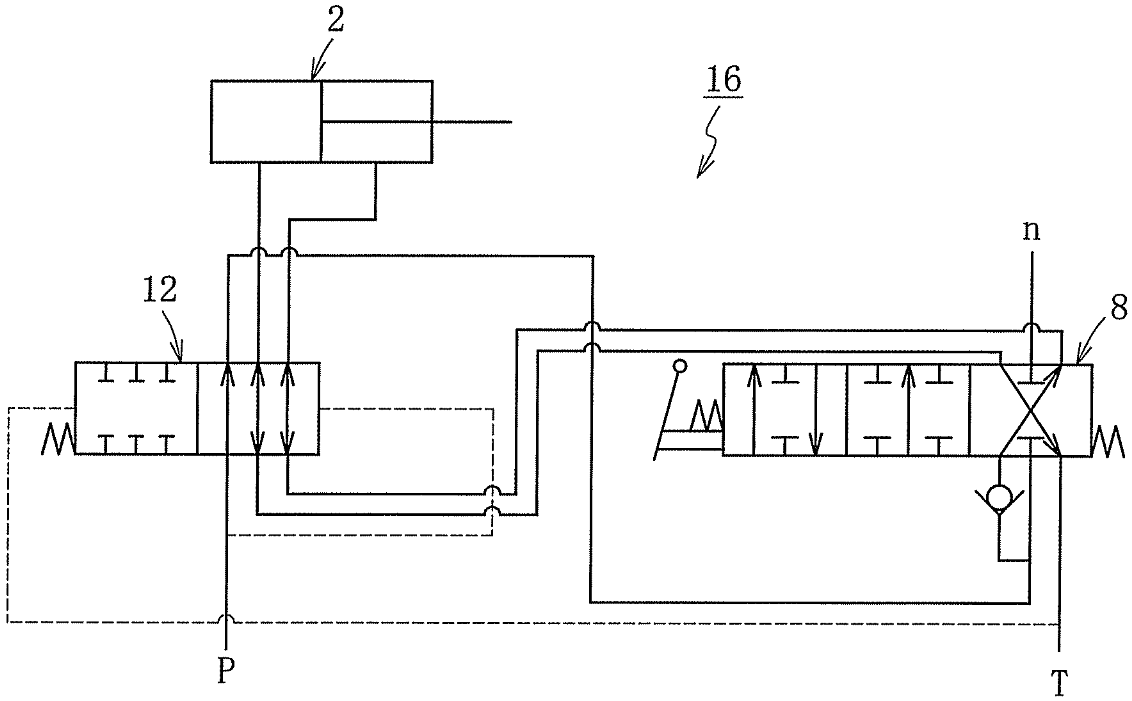
FIG. 6 is a diagram of a hydraulic circuit equivalent to the hydraulic controller illustrated in FIGS. 5*a* and 5*b*.

FIGS. 5*a* and 5*b* illustrate the hydraulic controller 1 during the operation of the pump P (when the engine of a work vehicle is maintained to be turned on). During the time period, similarly to the time when the operation of the pump P is started, the non-leak spool valve 12 is maintained in a state of being switched to the downward position. Then, as illustrated in FIGS. 5*a* and 5*b*, when the switch-spool valve 8 is switched to the downward position against the spring force of the main spring 9 by manipulation or an electromagnetic means, the first oil sump A and the second oil sump B of the switch-spool insertion hole 7 are communicated with each other and the fourth oil sump D and the fifth oil sump E are shut off from each other so that the sixth oil sump F and the seventh oil sump G are communicated with each other. With this, the pressure oil fed from the pump P to the second pressure-oil path V via the discharge port U is pumped into the rear space 2*b* of the piston cylinder 2 through the second extended path b and the second supply/drain pipe Z, and the pressure oil fed from the front space 2*a* of the piston cylinder 2 to the first extended path a through the first supply/drain pipe Y is returned to the tank T through the first oil-return path Q and the outlet port R. As a result, the piston 3 of the piston cylinder 2 is moved forward. Note that, the state of the hydraulic controller 1 at this time point is equivalent to the state of a hydraulic circuit 16 illustrated in FIG. 6. Meanwhile, while not shown, when the switch-spool valve 8 is switched from the neutral position to the upward position, the second oil sump B and the third oil sump C of the switch-spool insertion hole 7 are communicated with each other and the fourth oil sump D and the fifth oil sump E are shut off from each other so that the seventh oil sump G and the eighth oil sump H are communicated with each other. With this, the pressure oil fed from the pump P to the first pressure-oil path S via the discharge port U is pumped into the front space 2*a* of the piston cylinder 2 through the first extended path a and the first supply/drain pipe Y, and the pressure oil fed from the rear space 2*b* of the piston cylinder 2 to the second extended path b through the second supply/drain pipe Z is returned to the tank T through the second oil-return path W and the outlet port R. As a result, the piston 3 of the piston cylinder 2 is moved rearward. Then, at the time point when the switch-spool valve 8 is returned to the neutral position so as to stop the operation of the pump P (time point when the engine is turned off), the hydraulic controller 1 enters the state illustrated in FIGS. 1*a* and 1*b*. In this case, when the non-leak spool valve 12 is opened/closed, difference in oil pressure is not generated on any of both the sides of each of the gaskets O. Thus, the oil little flows whereas the pressure is conducted between both sides thereof. With this, protrusion of the gaskets O is eliminated, and hence it is possible to avoid damages thereof. Further, there is eliminated limitation on an arrangement position of a port relief valve (not shown), which is arranged in the hydraulic circuit of the controller 1. Simultaneously, regarding influence on the port relief valve and the like, in the case where the pump P is operated when the switch-spool valve 8 is located at the neutral position so that the oil flows, the port relief valve is normally operated because the supply/drain pipes Y and Z from the actuator 2 are communicated toward the switch-spool valve 8. Thus, influence on the entire system is eliminated. Note that, the non-leak spool valve 12 and the switch-spool valve 8 may be operated by respective separate pumps (pump communicated with the inlet path N1 and pump communicated with the discharge port U).

Figure 7A:
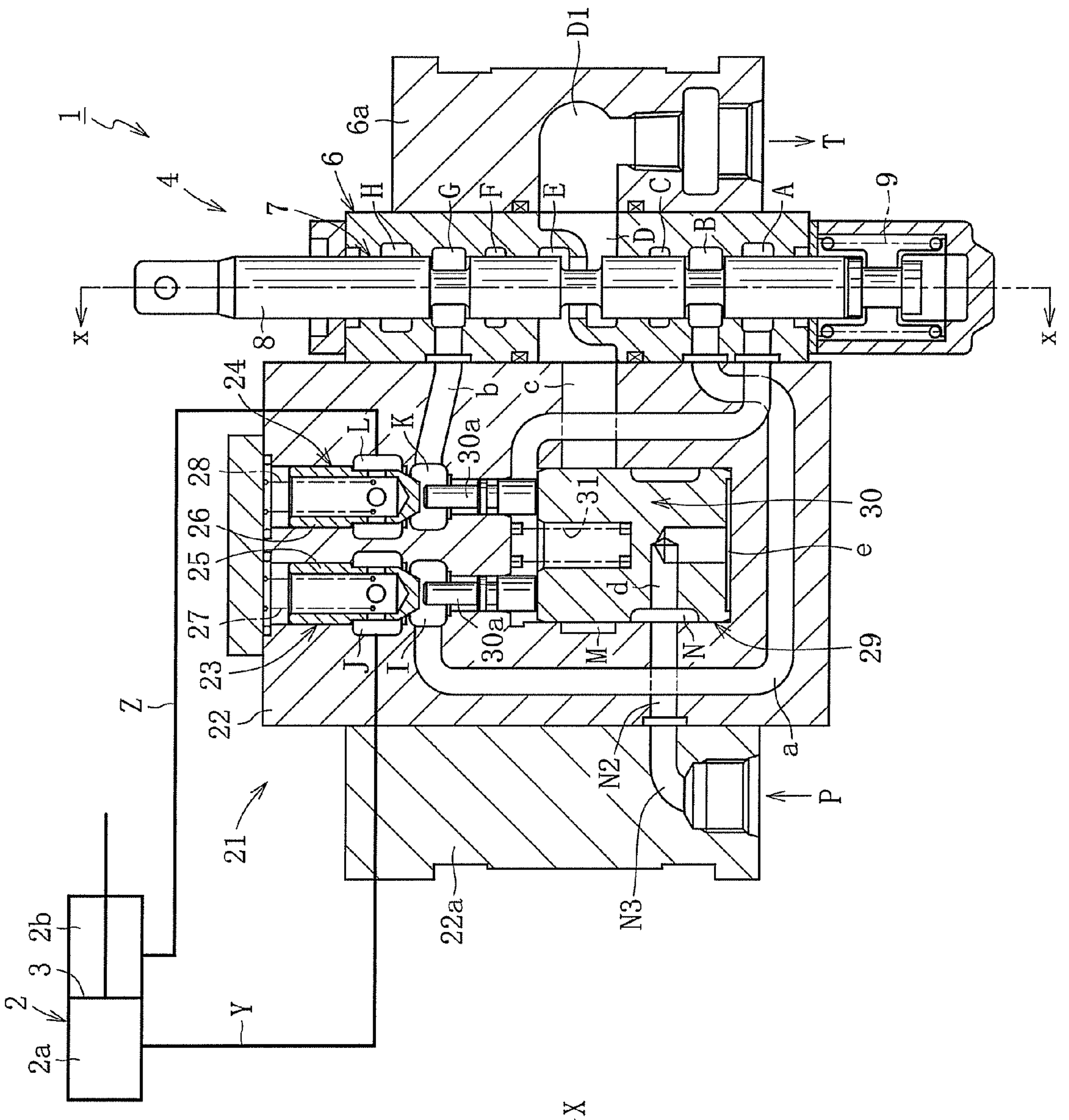
FIG. 7*a* is a vertical sectional front view of a hydraulic controller according to a second embodiment of the present invention.
Figure 7B:
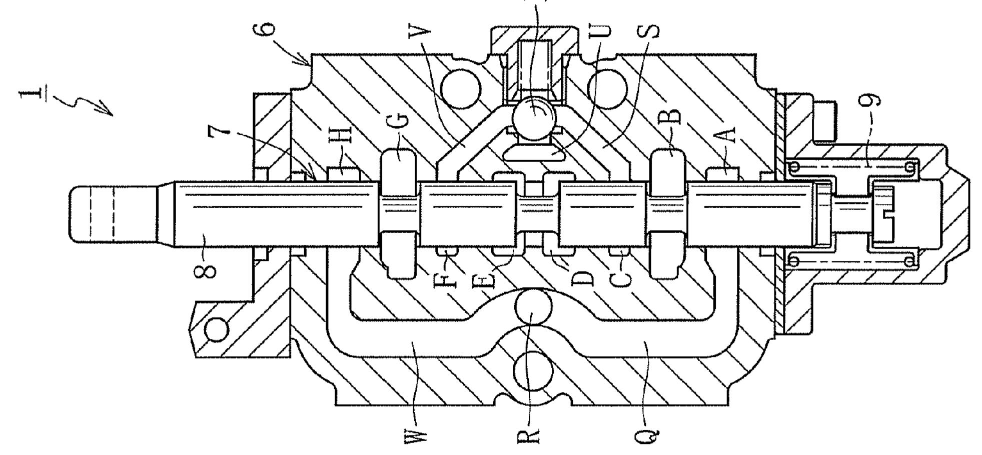
FIG. 7*b* is a sectional view taken along the line x-x of FIG. 7*a*.

FIGS. 7*a* and 7*b* illustrate a hydraulic controller 20 according to a second embodiment of the present invention. The direction switch means 4 of the hydraulic controller 1 according to the second embodiment is the same as the direction switch means 4 of the first embodiment mentioned above. Thus, the same components are denoted by the same reference symbols, and description thereof is omitted.

As illustrated in FIG. 7*a*, a leakage prevention means 21 of the hydraulic controller 20 according to the second embodiment includes a first non-leak insertion hole 23 and a second non-leak insertion hole 24 formed at one end portion (upper end portion) in an auxiliary housing 22 and arranged in parallel each other while extending in the upper and lower direction, the first non-leak check valve 25 and the second non-leak check valve 26 respectively inserted in the non-leak insertion holes 23 and 24 in a liquid-tight manner, and auxiliary springs 27 and 28 for elastically urging the non-leak check valves 25 and 26 downward, respectively. Further, the ninth oil sump I and the tenth oil sump J are formed communicably with each other in the first non-leak insertion hole 23, and the eleventh oil sump K and the twelfth oil sump L are formed communicably with each other in the second non-leak insertion hole 24. In addition, a lifting insertion hole 29 is formed in the auxiliary housing 22. In the lifting insertion hole 29, two push rods 30*a* and 30*a* are arranged in parallel each other at an upper end thereof and a lift body 30 elastically urged downward by a spring 31 is retained so as to be movable in the upper and lower direction. In this context, upper ends of the two push rods 30*a* and 30*a* can be brought into contact with lower ends of the first and second non-leak check valves 25 and 26. Further, the thirteenth oil sump M and the fourteenth oil sump N are formed in the lifting insertion hole 29. In addition, an auxiliary additional housing 22*a* is fixed on the left side of the auxiliary housing 22. In the auxiliary additional housing 22*a*, there is formed an inlet path N3 which is connected to a left end of an auxiliary inlet path N2 continuous with the fourteenth oil sump N and is communicated with the pump P. Accordingly, in the second embodiment, the non-leak valve is provided with a pair of non-leak check valves 25, 26 and a lift body 30.

In this context, the tenth oil sump J of the first non-leak insertion hole 23 is communicated with the front space 2*a* of the piston 3 in the piston cylinder 2 through an intermediation of the first supply/drain pipe Y. The twelfth oil sump L is communicated with the rear space 2*b* of the piston 3 in the piston cylinder 2 through an intermediation of the second supply/drain pipe Z. Further, the ninth oil sump I of the first non-leak insertion hole 23 is communicated with the second oil sump B of the switch-spool insertion hole 7 through an intermediation of the first extended path a, and the eleventh oil sump K of the second non-leak insertion hole 24 is communicated with the seventh oil sump G of the switch-spool insertion hole 7 through an intermediation of the second extended path b. In addition, the thirteenth oil sump M of the lifting insertion hole 29 is communicated with the fifth oil sump E of the switch-spool insertion hole 7 through an intermediation of the neutral path c. Note that, the fourteenth oil sump N is communicated with the switch oil sump e through an intermediation of the inner hole d formed in the lift body 30.

In accordance with the upward movement of the lift body 30, when the push rods 30*a* and 30*a* push up the first and second non-leak check valves 25 and 26 in the illustrated state (transfers to the state of FIG. 9*a*), the ninth oil sump I and the tenth oil sump J are communicated with each other so that the first supply/drain pipe Y from the front space 2*a* of the piston cylinder 2 and the second oil sump B of the switch-spool insertion hole 7 are communicated with each other, and the eleventh oil sump K and the twelfth oil sump L are communicated with each other so that the second supply/drain pipe Z from the rear space 2*b* of the piston cylinder 2 and the seventh oil sump G of the switch-spool insertion hole 7 are communicated with each other. Accordingly, a connection portion between the first supply/drain pipe Y and the first extended path a, that is, a space between the ninth oil sump I and the tenth oil sump J is opened/closed by the first non-leak check valve 25, and a connection portion between the second supply/drain pipe Z and the second extended path b, that is, a space between the eleventh oil sump K and the twelfth oil sump L is opened/closed by the second non-leak check valve 26.

Next, description is made on an operation of the hydraulic controller 20 according to the second embodiment.

FIGS. 7*a* and 7*b* illustrate the hydraulic controller 20 when the pump P is out of operation (while an engine of a work vehicle is turned off). In this state, both the respective tenth oil sump J and the twelfth oil sump L of the first and second non-leak insertion holes 23 and 24, which are respectively communicated with the first supply/drain pipe Y and the second supply/drain pipe Z from the piston cylinder 2, are closed by the first and second non-leak spool valves 25 and 26, respectively. Accordingly, both the first supply/drain pipe Y and the second supply/drain pipe Z are maintained in the state of being completely shut off from the switch-spool insertion hole 7. Further, when the piston 3 of the piston cylinder 2 is pressed forward, pressure oil in the front space 2*a* of the piston cylinder 2 fills the first supply/drain pipe Y and the tenth oil sump J, and when the piston 3 of the piston cylinder 2 is pressed rearward, pressure oil in the rear space 2*b* of the piston cylinder 2 fills the second supply/drain pipe Z and the twelfth oil sump L. With this, even when load acts on the piston 3 of the piston cylinder 2, the movement of the piston 3 is reliably prevented.

Figure 8A:
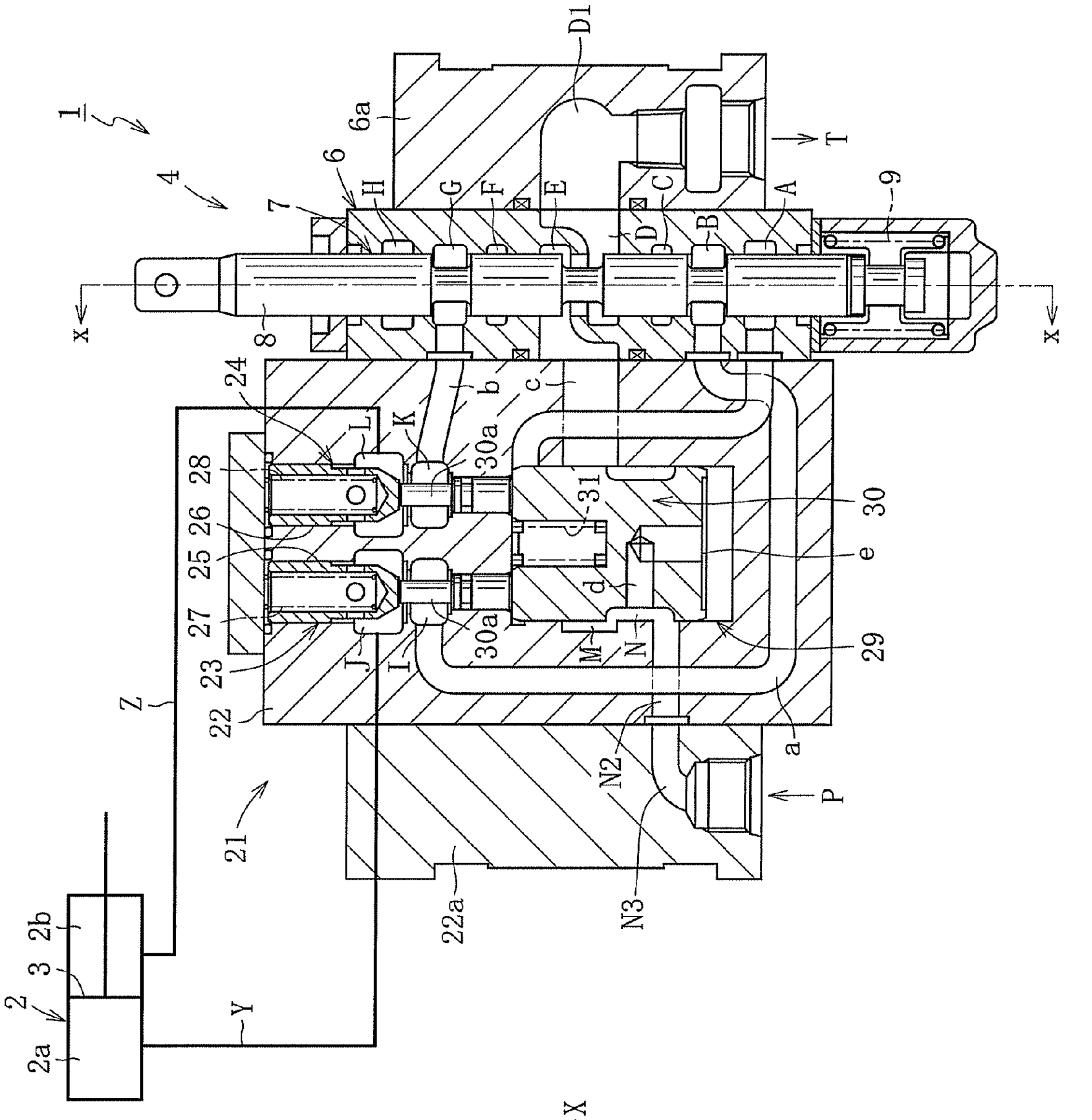
FIG. 8*a* is a vertical sectional front view of a state in which a non-leak valve of the hydraulic controller according to the second embodiment is switched.
Figure 8B:
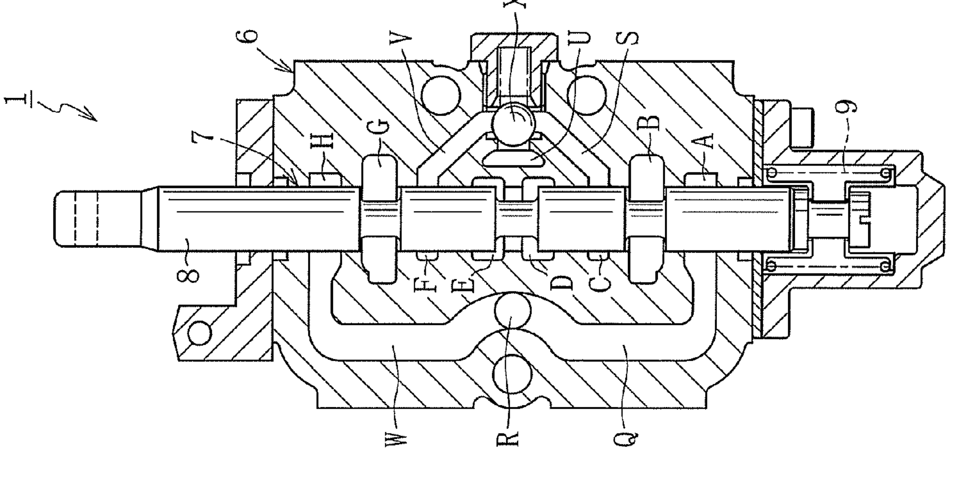
FIG. 8*b* is a sectional view of the line x-x of FIG. 8*a*.

FIGS. 8*a* and 8*b* illustrate the hydraulic controller 20 when the operation of the pump P is started (when the engine of a work vehicle is turned on). In this state, the pressure oil fed from the pump P is supplied from the inner hole d into the switch oil sump e via the inlet path N3 and the auxiliary inlet path N2. Thus, the lift body 30 is moved upward against the spring force of the spring 31, and the push rods 30*a* and 30*a* push up the first and second non-leak check valves 25 and 26 so as to switch the same to the upward position. With this, the ninth oil sump I and the tenth oil sump J are communicated with each other so that the first supply/drain pipe Y is communicated with the second oil sump B through an intermediation of the first extended path a, and the eleventh oil sump K and the twelfth oil sump L are communicated with each other so that the second supply/drain pipe Z is communicated with the seventh oil sump G through an intermediation of the second extended path b. As a result, the piston 3 in the piston cylinder 2 is released from the movement-prevented state. At this time point, the switch-spool valve 8 is located at the neutral position, and the thirteenth oil sump M and the fourteenth oil sump N are communicated with each other. Thus, the pressure oil fed from the pump P to the inlet path N3 and the auxiliary inlet path N2 flows into the fifth oil sump E through the neutral path c. At the same time, the fifth oil sump E and the fourth oil sump D are communicated with each other, and hence an idling operation can be performed.

Figure 9A:
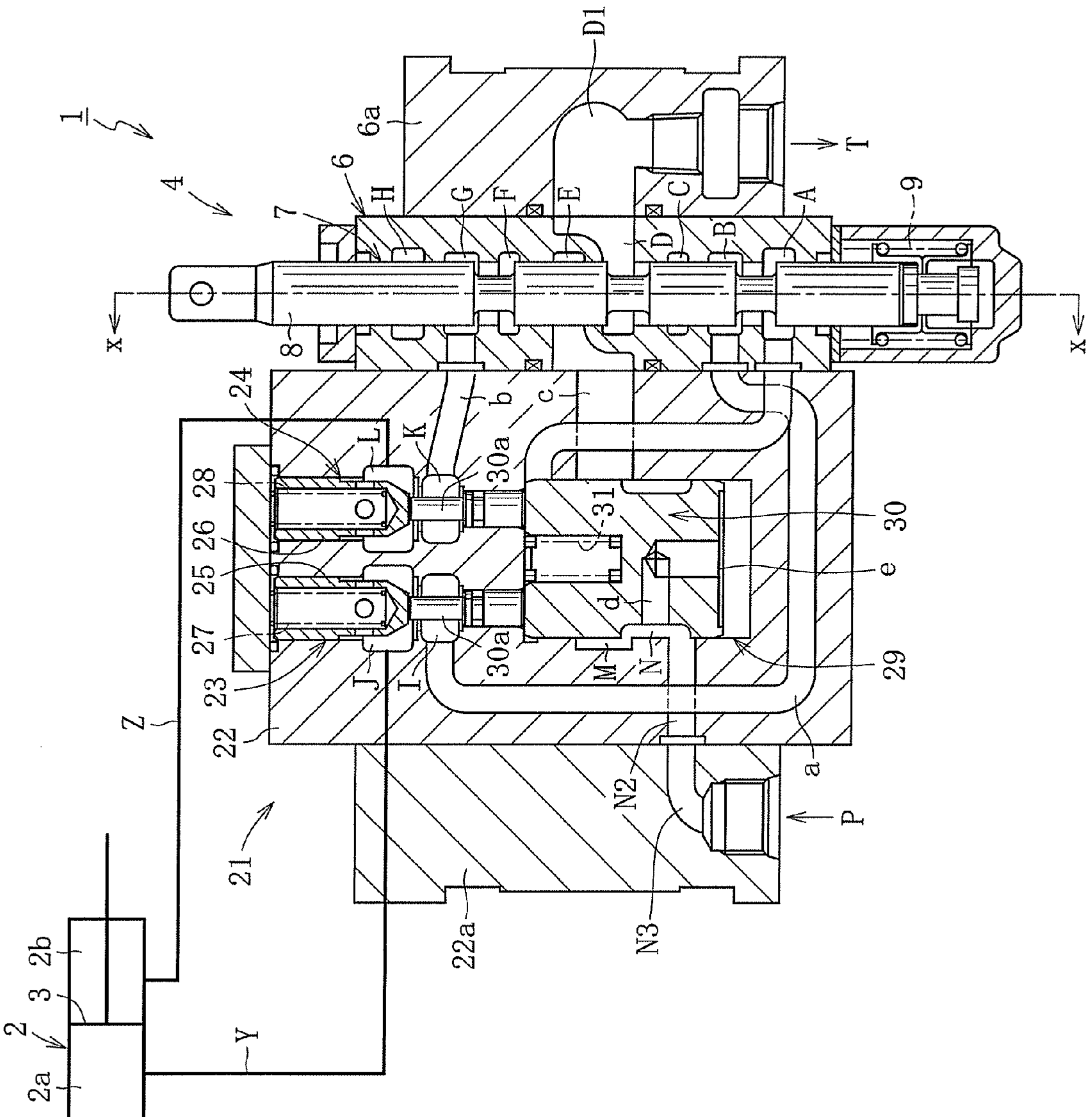
FIG. 9*a* is a vertical sectional front view of a state in which a switch-spool valve of the hydraulic controller according to the second embodiment is switched.
Figure 9B:
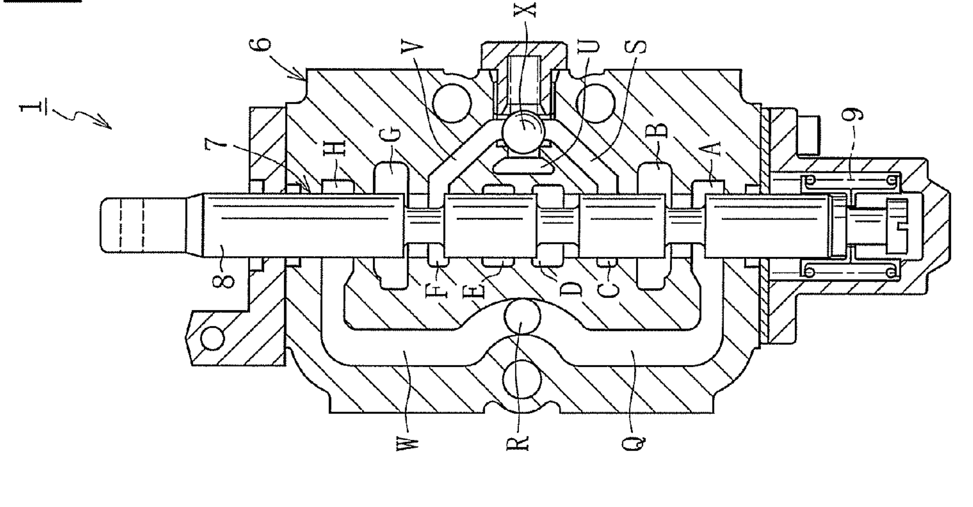
FIG. 9*b* is a sectional view taken along the line x-x of FIG. 9*a*.

FIGS. 9*a* and 9*b* illustrate the hydraulic controller 20 during the operation of the pump P (when the engine of a work vehicle is maintained to be turned on). During the time period, similarly to the time when the operation of the pump P is started, the first and second non-leak check valves 25 and 26 are maintained in a state of being switched to the upward position. Then, when the switch-spool valve 8 is switched to the downward position against the spring force of the main spring 9, the first oil sump A and the second oil sump B are communicated with each other and the fourth oil sump D and the fifth oil sump E are shut off from each other so that the sixth oil sump F and the seventh oil sump G are communicated with each other. With this, the pressure oil fed from the pump P to the second pressure-oil path V via the discharge port U is pumped into the rear space 2*b* of the piston cylinder 2 through the second extended path b and the second supply/drain pipe Z, and the pressure oil fed from the front space 2*a* of the piston cylinder 2 to the first extended path a through the first supply/drain pipe Y is returned to the tank T through the first oil-return path Q and the outlet port R. As a result, the piston 3 of the piston cylinder 2 is moved forward. Meanwhile, while not shown, when the switch-spool valve 8 is switched from the neutral position to the upward position, the second oil sump B and the third oil sump C are communicated with each other and the fourth oil sump D and the fifth oil sump E are shut off from each other so that the seventh oil sump G and the eighth oil sump H are communicated with each other. With this, the pressure oil fed from the pump P to the first pressure-oil path S via the discharge port U is pumped into the front space 2*a* of the piston cylinder 2 through the first extended path a and the first supply/drain pipe Y, and the pressure oil fed from the rear space 2*b* of the piston cylinder 2 to the second extended path b through the second supply/drain pipe Z is returned to the tank T through the second oil-return path W and the outlet port R. As a result, the piston 3 of the piston cylinder 2 is moved rearward. Then, at the time point when the switch-spool valve 8 is returned to the neutral position so as to stop the operation of the pump P (time point when the engine is turned off), the hydraulic controller 20 enters the state illustrated in FIGS. 7*a* and 7*b*. In this case, the forces at the time of opening the first and second non-leak check valves 25 and 26 are irrelevant to variations in load during an operation of the actuator 2. Thus, problems of hunting are eliminated, and it is unnecessary to provide a throttle valve, with the result that the operating speed of the actuator 2 can be easily controlled. Further, the forces for opening the first and second non-leak check valves 25 and 26 are automatically increased in accordance with the load from the actuator 2, and after opening the first and second non-leak check valves 25 and 26, the forces become sufficient as long as being capable of resisting the spring forces of the springs 27 and 28 for returning the first and second non-leak check valves 25 and 26 downward and the forces for hydraulically returning the push rods 30*a* and 30*a* downward, with the result that losses in the entire circuit are decreased. In addition, advantages obtained by the port relief valve are the same as those in the case of the first embodiment. Note that, the first and second non-leak check valves 25 and 26 and the switch-spool valve 8 may be operated by respective separate pumps (pump communicated with the inlet path N3 and pump communicated with the discharge port U).

Instead of fixing the main housing and the auxiliary housing integrally with each other as in each of the above-mentioned embodiments, the extended paths and the neutral path may be arranged while both the housings are separated from each other. In this manner, paths between both the housings may be constituted.

The invention claimed is:

1. A hydraulic controller comprising:

a pair of supply/drain pipes that are continuous with an actuator;

pressure-oil paths that are continuous with a pump;

oil-return paths that are continuous with a tank;

a housing having a switch-spool insertion hole through an intermediation of which the supply/drain pipes, the pressure-oil paths, and the oil-return paths are communicated with each other; and a switch-spool valve that is liquid-tightly inserted into the switch-spool insertion hole so as to form a desired oil path, wherein the pair of supply/drain pipes are respectively communicable with a pair of oil sumps through an intermediation of a pair of respective extended paths, the pair of oil sumps being formed in the switch-spool insertion hole and being switchable between a state of being selectively communicated with any one of the respective pressure-oil paths and the respective oil-return paths according to a movement of the switch-spool valve and a state of not being communicated with any of the pressure-oil paths and the oil-return paths; and a non-leak valve, which is closable to prevent communication of oil toward the switch-spool insertion hole, is provided over respective connection portions between the pair of supply/drain pipes and the pair of extended paths, wherein the non-leak valve is maintained at a predetermined position, without movement, in a state of being opened so as to allow communication of oil toward the switch-spool insertion hole when the switch-spool valve is in a state: capable of causing the pair of supply/drain pipes to switch between a state of communicating with the respective pressure-oil paths and a state of communicating with the respective oil-return paths; and having completed moving to a section where driving of the actuator can be controlled.

2. A hydraulic controller according to claim 1, wherein the non-leak valve is moved in an opening direction and opened by pressure oil fed from the pump when the operation of the pump is started, is maintained opened by the pressure oil during the operation of the pump, and is moved in a closing direction owing to a stoppage of feeding of the pressure oil and closed when the pump is out of operation.

3. A hydraulic controller according to claim 1, wherein the switch-spool valve and the non-leak valve are incorporated in separate housings.

4. A hydraulic controller according to claim 1, wherein the non-leak valve comprises a single non-leak spool valve for simultaneously opening/closing the respective connection portions between the pair of supply/drain pipes and the pair of extended paths.

5. A hydraulic controller according to claim 1, wherein the non-leak valve comprises a pair of non-leak check valves for simultaneously and individually opening/closing the respective connection portions between the pair of supply/drain pipes and the pair of extended paths, and a lift body including a pair of push rods for opening and closing the pair of non-leak check valves according to the operation and the non-operation of the pump.

6. A hydraulic controller according to claim 2, wherein the switch-spool valve and the non-leak valve are incorporated in separate housings.

7. A hydraulic controller according to claim 2, wherein the non-leak valve comprises a single non-leak spool valve for simultaneously opening/closing the respective connection portions between the pair of supply/drain pipes and the pair of extended paths.

8. A hydraulic controller according to claim 2, wherein the non-leak valve comprises a pair of non-leak check valves for simultaneously and individually opening/closing the respective connection portions between the pair of supply/drain pipes and the pair of extended paths.

9. A hydraulic controller according to claim 2, wherein the non-leak valve comprises a pair of non-leak check valves for simultaneously and individually opening/closing the respective connection portions between the pair of supply/drain pipes and the pair of extended paths, and a lift body including a pair of push rods for opening and closing the pair of non-leak check valves according to the operation and the non-operation of the pump.

10. A hydraulic controller according to claim 3, wherein the non-leak valve comprises a pair of non-leak check valves for simultaneously and individually opening/closing the respective connection portions between the pair of supply/drain pipes and the pair of extended paths, and a lift body including a pair of push rods for opening and closing the pair of non-leak check valves according to the operation and the non-operation of the pump.

11. A hydraulic controller according to claim 1, wherein the non-leak valve comprises a first non-leak check valve, a second non-leak check valve, and a lift body having two push rods that are attached to and protrude from the lift body.

12. A hydraulic controller according to claim 2, wherein the non-leak valve comprises a first non-leak check valve, a second non-leak check valve, and a lift body having two push rods that are attached to and protrude from the lift body.

13. A hydraulic controller according to claim 3, wherein the non-leak valve comprises a first non-leak check valve, a second non-leak check valve, and a lift body having two push rods that are attached to and protrude from the lift body.

* * * * *